United States Patent
Hauser et al.

[11] Patent Number: 6,093,003
[45] Date of Patent: Jul. 25, 2000

[54] PISTON PUMP

[75] Inventors: Manfred Hauser, Schwieberdingen; Ernst-Dieter Schaefer, Brackenheim; Wolfgang Schuller, Sachsenheim; Erwin Sinnl, Meimsheim; Peter Lang, Rutesheim, all of Germany

[73] Assignee: Robert Bosch GmbH, Stuttgart, Germany

[21] Appl. No.: 09/045,539

[22] Filed: Mar. 23, 1998

[30] Foreign Application Priority Data

Mar. 21, 1997 [DE] Germany ............................ 197 11 786
Nov. 27, 1997 [DE] Germany ............................ 197 52 546

[51] Int. Cl.$^7$ ...................................................... F01B 1/00
[52] U.S. Cl. ........................... 417/541; 417/540; 417/523; 92/147
[58] Field of Search ..................... 417/541, 470, 417/540, 549, 523; 92/147, 148; 91/475, 491

[56] References Cited

U.S. PATENT DOCUMENTS

| | | |
|---|---|---|
| 5,213,482 | 5/1993 | Reinartz et al. |
| 5,551,767 | 9/1996 | Linkner, Jr. ............................... 303/87 |
| 5,601,345 | 2/1997 | Tackett ................................. 303/116.4 |
| 5,628,625 | 5/1997 | Dokas ...................................... 417/523 |
| 5,716,111 | 2/1998 | Schenk et al. ........................ 303/116.4 |
| 5,722,738 | 3/1998 | Beck et al. ........................... 303/116.4 |
| 5,823,639 | 10/1998 | Zinnkann et al. .................... 303/116.4 |
| 5,839,349 | 11/1998 | Volz .......................................... 92/147 |

FOREIGN PATENT DOCUMENTS

| | | |
|---|---|---|
| 40 27 794 A1 | 3/1992 | Germany . |
| 41 07 979 A1 | 9/1992 | Germany . |
| 41 28 386 A1 | 3/1993 | Germany . |

*Primary Examiner*—John A. Jeffery
*Assistant Examiner*—Vinod D Patel
*Attorney, Agent, or Firm*—Ronald E. Greigg; Edwin E. Greigg

[57] ABSTRACT

The invention relates to a piston pump with a piston received axially displaceably in a pump bore. To improve the aspiration performance of the piston pump. A cuff with a U-shaped annular cross section is provided, the cuff is inserted into the pump bore surrounding the piston, an outer lip forms a diaphragm, which rests against a wall of the pump bore and is acted upon on its outside with ambient pressure through a venting bore. The cuff is part of a fluid storage element, which makes an additional fluid volume available to the piston pump. The diaphragm acted upon by ambient pressure creates a pumping effect, if a fluid pressure in the fluid storage element drops below ambient pressure in an intake stroke of the piston.

8 Claims, 2 Drawing Sheets

PISTON PUMP

BACKGROUND OF THE INVENTION

The invention is based on a piston pump that is intended for use in a hydraulic brake system of a vehicle.

Such piston pumps are known per se; as an example, reference may be made to the piston pump disclosed in German Patent Application DE 41 07 979 A1. The known piston pump has a pump housing with a pump bore disposed in it, in which bore a bush is inserted. A piston, which can be driven into an axially reciprocating stroke motion is axially displaceably received in the bush. It is also known for the piston to be inserted axially displaceably into the pump housing directly, without a bush.

A problem in the known piston pumps is their aspiration performance, especially at low temperatures and with fluid to be pumped that is consequently viscous. Narrow line cross sections, bent line courses, and throttle restrictions at screw fastenings or hydraulic components such as the master cylinder, magnet valves and check valves, create high flow resistance on an intake side of the piston pump and thereby retard a pressure buildup by means of the piston pump.

For this reason, in German Patent Application DE 41 28 368 A1, whose subject is a vehicle hydraulic brake system with a traction control device using a piston pump, it is proposed that a pressure fluid reservoir be provided on the intake side of the piston pump, the reservoir making an additional fluid volume available to the piston pump in order to smooth out pressure pulsations. However, the known vehicle brake system has the disadvantage that the pressure fluid reservoir entails an increased production cost. A further factor is that an additional fluid volume represents additional elasticity, which makes the vehicle brake system actuation softer or "spongier", leading to an inaccurate pressure point upon actuation of the vehicle brake system.

OBJECT AND SUMMARY OF THE INVENTION

In the piston pump of the invention as defined by the main claim, a fluid reservoir with a storage volume is provided inside the piston pump itself. As a result, the storage volume is available to the piston pump immediately within an aspiration region of the piston pump itself and thus over the shortest possible path, with at most one inlet valve as the sole throttle restriction, between the storage volume and a displacement chamber. As a result, the piston pump of the invention has optimal aspiration performance; the additional storage volume directly inside the aspiration region of the piston pump means that the piston pump is always well filled during operation even if the fluid to be pumped is viscous, and good pump efficiency and a rapid pressure buildup even under unfavorable operating conditions are thereby assured.

A further advantage of the piston pump of the invention is that its fluid reservoir forms a damper element, which damps pressure fluctuations and surges, which are caused by the piston pump because of its pulselike or shocklike suction and pumping behavior, directly where they occur. This damping behavior of the additional fluid reservoir of the piston pump of the invention makes for a more uniform pumping flow of the fluid pumped by the piston pump and thus improves pump efficiency. Noise development and stress on the components of the vehicle brake system from pressure fluctuations and surges are also counteracted.

The fluid storage element of the piston pump of the invention may be provided in a hollow chamber of the piston.

In another feature of the invention, the fluid storage element is provided inside the pump bore.

An elastic or in other words variable-volume damper element is provided inside the fluid storage element and improves the damping properties of the fluid storage element. An additional advantage of the damper element is that it increases its volume if a fluid pressure on the intake side of the piston pump drops during an intake stroke of the piston, since a supply of fluid to the displacement chamber of the piston pump is promoted by the increase in volume of the damper element.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from braking out of the lane desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

The invention will be better understood and further objects and advantages thereof will become more apparent from the ensuing detailed description of preferred embodiments taken in conjunction with the drawings.

DESCRIPTION OF THE FIRST PREFERRED EMBODIMENT

Figure 1:
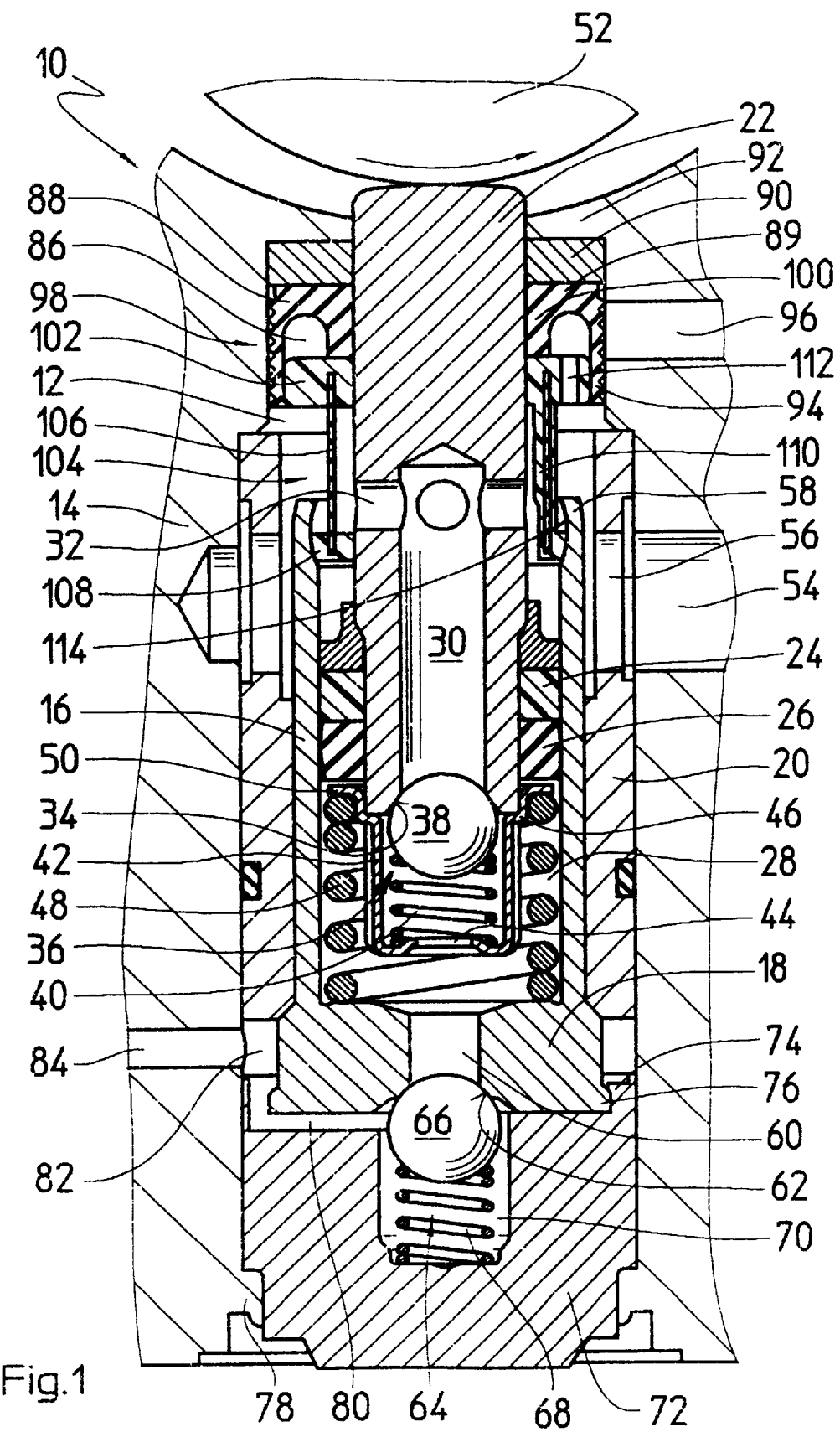
FIG. 1 is an axial section through a piston pump of the invention.

The piston pump of the invention, shown in FIG. 1 and identified overall by reference numeral 10, is inserted into a pump bore 12, which is provided in the form of a stepped, continuous bore in a hydraulic block that forms a pump housing 14. The hydraulic block, of which FIG. 1 shows only a fragment surrounding the piston pump 10, is part of a slip-controlled hydraulic brake system of a vehicle, not otherwise shown. In addition to the piston pump 10, other hydraulic components, such as magnet valves, hydraulic reservoirs, dampers and the like are inserted into the hydraulic block and connected hydraulically to one another and to the piston pump 10.

The piston pump 10 has a tubular bush 16, with a bush bottom 18, integral with it, on one face end. The bush 16 is press-fitted into a pipe segment 20 and inserted together with the bush into the pump bore 12 in the pump housing 14.

A bolt-like piston 22 is received over approximately half its length in the bush 16 and is guided axially displaceably in the bush 16 by means of a plastic guide ring 24 and sealed off in the bush 16 by means of a sealing ring 26. The piston 22 encloses a displacement chamber 28 between itself, or its sealing ring 26, and the bush bottom 18 in the bush 16.

For fluid admission, the piston 22 is provided with an axial blind bore 30 extending from its face end toward the bush bottom 18; this bore extends approximately to the longitudinal center of the piston 22, where it is intersected by two transverse bores 32. A mouth of the blind bore 30, oriented toward the bush bottom 18, is embodied conically as a valve seat 34 of an inlet valve 36 of the piston pump 10. The inlet valve 36 is a spring-loaded check valve, with a valve ball 38 as its valve closing body, which is pressed against the valve seat 34 by a helical compression spring 40 acting as a valve closing spring. The valve ball 38 and the valve closing spring 40 are received in a cup-shaped valve cage 42, which is made as a deep-drawn sheet-metal part and mounted on the face end of the piston 22 toward the bush bottom 18. A hole in the form of an opening 44 for brake fluid flowing into the piston pump 10 is made in a bottom of the valve cage 42.

The valve cage 42 has an annular step 46, which is mounted on the face end of the piston 22 toward the bush bottom 18. A piston restoring spring 48, which is inserted into the displacement chamber 28 in the bush 16 and which is braced from inside on the bush bottom 18, presses against a radial flange 50, formed onto the free end edge of the valve cage 42, and in this way keeps the valve cage 42 in contact, by its annular step 46, with the face end of the piston 22. The piston restoring spring 48 embodied as a helical compression spring is considerably stronger than the valve closing spring 40 of the inlet valve 36; it reliably holds the valve cage 42 against the face end of the piston 22, counter to the force of the valve closing spring 40.

Via the radial flange 50 and the annular step 46 of the valve cage 42, the piston restoring spring 48 presses the piston 22, with a face end protruding out of the bush 16, against a circumference of an eccentric 52 that can be driven to rotate by an electric motor and that serves to drive the piston 22 in a manner known per se to execute an axially reciprocating stroke motion in the bush 16.

The piston pump 10 of the invention has an inlet bore 54, which is mounted radially in the pump bore 12, discharging inside the pump housing 14. Fluid flowing into the piston pump 10 from the inlet bore 54 passes through bores 56, which are mounted at the level of the inlet bore 54 in the pipe segment 20, into the pump bore 12, and after flowing around a free end edge 58 on an end of the bush 16 remote from the bush bottom 18, the fluid passes into the transverse bores 32 and from there into the blind bore 30 of the piston 22.

For fluid release, the piston pump 10 of the invention has a center hole 60, which penetrates the bush bottom 18 and whose mouth remote from the displacement chamber 28 is embodied conically as a valve seat 62 of an outlet valve 64 of the piston pump 10 of the invention. The outlet valve 64 is embodied as a spring-loaded check valve and has a valve ball 66 as its valve closing body, which is pressed against the valve seat 62 by a helical compression spring acting as a valve closing spring 68. The valve ball 66 and valve closing spring 68 are received in a blind bore 70 in a cylindrical closure part 72, which is mounted by means of a crimp 74 on a radial collar 76 of the bush bottom 18 that protrudes past a circumference. By means of caulking 78 extending all the way around the pump housing 14, the closure part 72 is mounted in the pump bore 12 in such a way as to close off the pump bore 12 in pressure-tight fashion, and it fixes the bush 16 in the pump bore 12.

Brake fluid flowing out of the piston pump 10 through the outlet valve 64 passes through radial conduits 80, in an end face of the closure part 72 oriented toward the bush bottom 18, into an annular conduit 82 surrounding the bush bottom 18 and from there into an outlet bore 84 mounted in the pump housing 14 radially to the pump bore 12.

The piston pump 10 has a fluid storage element 86, which is accommodated in one end of the pump bore 12 on the side of the eccentric 52, inside the pump bore 12 in an extension of the bush 16 and of the pipe segment 20 into which the bush 16 is press-fitted. The fluid storage element 86 has an annular fluid volume surrounding the piston 22. The fluid storage element 86 has an annular cuff 88 with a U-shaped annular cross section, which comprises an elastomer such as artificially made rubber; the fluid volume of the fluid storage element 86 is located in the interior of the U-shaped annular cross section of the cuff 88. This interior is open in the direction of the bush 16. With an annular face 89, which forms a yoke of its U-shaped annular cross section and is oriented toward the eccentric 52, the cuff 88 rests on a support ring 90, which is braced axially against an annular step 92 on an end of the pump bore 12 oriented toward the eccentric 52. The cuff 88 has an outer encompassing lip 94, which takes the form of a hollow cylinder and forms one leg of the U-shaped annular cross section of the cuff 88. The lip 94 rests in fluid-tight fashion against a wall of the pump bore 12. The lip 94 is acted upon with ambient pressure on its outside through a venting bore 96, which communicates with ambient pressure and discharges radially into the pump bore 12 in the region of the lip 94. The lip 94 forms an elastically yielding diaphragm, which divides the fluid volume contained in the fluid storage element 86 on its inside from the ambient air on its outside. The lip 94 of the cuff 88 will therefore hereinafter be called the diaphragm 94. The diaphragm 94 is provided with an encompassing fluting 98 on its outer surface, which prevents the diaphragm 94 from sticking to the wall of the pump bore 12.

In addition to the outer lip that forms the diaphragm 94, the cuff 88 has a hollow-cylindrical inner sealing lip 100, which rests sealingly on the piston 22. The sealing lip 100 forms a second leg of the U-shaped annular cross section of the cuff 88. The sealing lip 100 is shorter in the axial direction than the diaphragm 94.

Axially adjoining the sealing lip 100, a ring 102 surrounding the piston 22 is inserted into the cuff 88 inside the diaphragm 94. This ring 102 keeps a free end of the diaphragm 94 in sealing contact with the wall of the pump bore 12, so that if there is a negative pressure in the pump bore 12, the ambient pressure acting upon the outside of the diaphragm 94 cannot lift the free end of the diaphragm 94 from the wall of the pump bore 12 and thereby create a communication between the venting bore 96 and the pump bore 12. The ring 102 is part of a filter screen 104, which surrounds the piston 22 in the region of its transverse bores 32. The filter screen 104 has a tubular perforated metal sheet 106 surrounding the piston 22, one face end of the sheet being spray-coated with the ring 102 that keeps the free end of the diaphragm 94 in sealing contact with the wall of the pump bore 12. The filter screen 104 has a second ring 108, with which another face end of the perforated sheet 106 is spray-coated. The two rings 102, 108 of the filter screen 104 are integrally joined to one another by axial ribs 110 coextruded with them. The ring 102 that keeps the diaphragm 94 in contact with the wall of the pump bore 12 has a number of axially continuous flow holes 112, through which the fluid received in the interior of the cuff 88, that is, in the fluid storage element 86, communicates with the pump bore 12 and by way of it with the inlet bore 54 in the pump housing 14 and with the transverse bores 32 in the piston 22. With its ring 108 remote from the cuff 88, the filter screen 104 is mounted, in the manner of a clip connection, in a rounded, encompassing groove 114 on an inside of the bush 16, on the end edge 58 thereof.

The function of the fluid storage element 86 is as follows: In an intake stroke of the piston 22, in which the piston moves out of the bush 16 by the length of one piston stroke, the inlet valve 36 opens in response to a pressure difference between the displacement chamber 28 and the blind bore 30 in the piston 22, so that the displacement chamber 28 communicates with the pump bore 12 through the axial hole 30 and the transverse bores 32 of the piston 22. The total volume of the pump bore 12 and the displacement chamber 28 increases upon the intake stroke of the piston 22, since the volumetric increase in the displacement chamber 28, as a result of its larger cross-sectional area, is greater than the volumetric decrease in the pump bore 12, which decreases by the product of an annular surface area of a gap between the piston 22 and the bush 16 and the piston stroke. This increase in volume leads to a pressure drop both in the displacement chamber 28 and in the pump bore 12 and thus leads to the aspiration of fluid from the inlet bore 54. The drop in pressure in the pump bore 12, through the flow holes 112 in the ring 102 of the filter screen 104, brings about a pressure drop in the fluid storage element 86. As a result, the diaphragm 94, in the region not held in contact against the wall of the pump bore 12 by the ring 102, is elastically deformed inward, which reduces the fluid volume of the fluid storage element 86. The fluid flowing out of the fluid storage element 86 into the pump bore 12 through the flow holes 112 as a consequence of the decrease in volume of the fluid storage element 86 passes through the pump bore 12 to reach the transverse bores 32 and the blind bore 30 of the piston 22 and through the opened inlet valve 36 to reach the displacement chamber 28 of the piston pump 10. Thus during an intake stroke, an additional fluid volume is available for aspiration to the piston pump 10 of the invention. This additional fluid volume passes through wide flow cross sections and over a short distance and thus with only a slight flow resistance to reach the displacement chamber 28.

The flow of the fluid volume received in the fluid storage element 86 into the displacement chamber 28 of the piston pump 10 in the intake stroke of the piston 22 is reinforced by the action on the outside of the diaphragm 94 of ambient pressure, which at the lowered fluid pressure resulting from the intake stroke of the piston 22 bulges the diaphragm 94 inward and thereby reduces the fluid volume of the fluid storage element 86 and positively displaces fluid out of the fluid storage element 86. The ambient pressure acting on the outside of the diaphragm 94 through the venting bore 86 creates a pumping effect, which pumps the fluid volume, received in the fluid storage element 86, in the direction of the displacement chamber 28 and thereby improves the aspiration performance of the piston pump 10. A closing force of the valve closing spring 40 of the inlet valve 36 is slight and can therefore be considered insignificant, in the preceding discussion of the mode of operation of the fluid storage element 86. Under some circumstances, in the case of a self-aspirating piston pump 10, the valve closing spring 40 of the inlet valve 36 can be dispensed with entirely.

In the pumping stroke of the piston 22, in which the piston 22 moves inward into the bush 66 by the length of the piston stroke, the inlet valve 36 closes, thereby separating the displacement chamber 28 and the pump bore 12 from one another. The piston 22 moving into the bush 16 in the pumping stroke increases the volume of the pump bore 12, and as a result brake fluid is aspirated into the pump bore 12 through the inlet bore 54 of the pump housing 14. At the end of the pumping stroke, because of the mass inertia of the aspirated brake fluid, additional brake fluid flows into the pump bore 12, so that at the latest by the end of the pumping stroke, a pressure equilibrium or an overpressure is established in the pump bore 12 and thus in the fluid storage element 86 as well; this presses the diaphragm 94 back against the wall of the pump bore 12, increases the fluid volume of the fluid storage element 86 to its original magnitude again, and refills the fluid storage element 86 with brake fluid.

In addition to its function of furnishing the piston pump 10 with an additional fluid volume in the intake region upon the intake stroke of the piston 22, the fluid storage element 86 has a damping action because of the elasticity of the cuff 88 made from an elastomer; the fluid storage element 86 damps pressure fluctuations in the fluid aspirated by the piston pump 10, which are caused by the oscillating, reciprocating stroke motion of the piston 22, immediately where they occur.

DESCRIPTION OF THE SECOND PREFERRED EMBODIMENT

Figure 2:
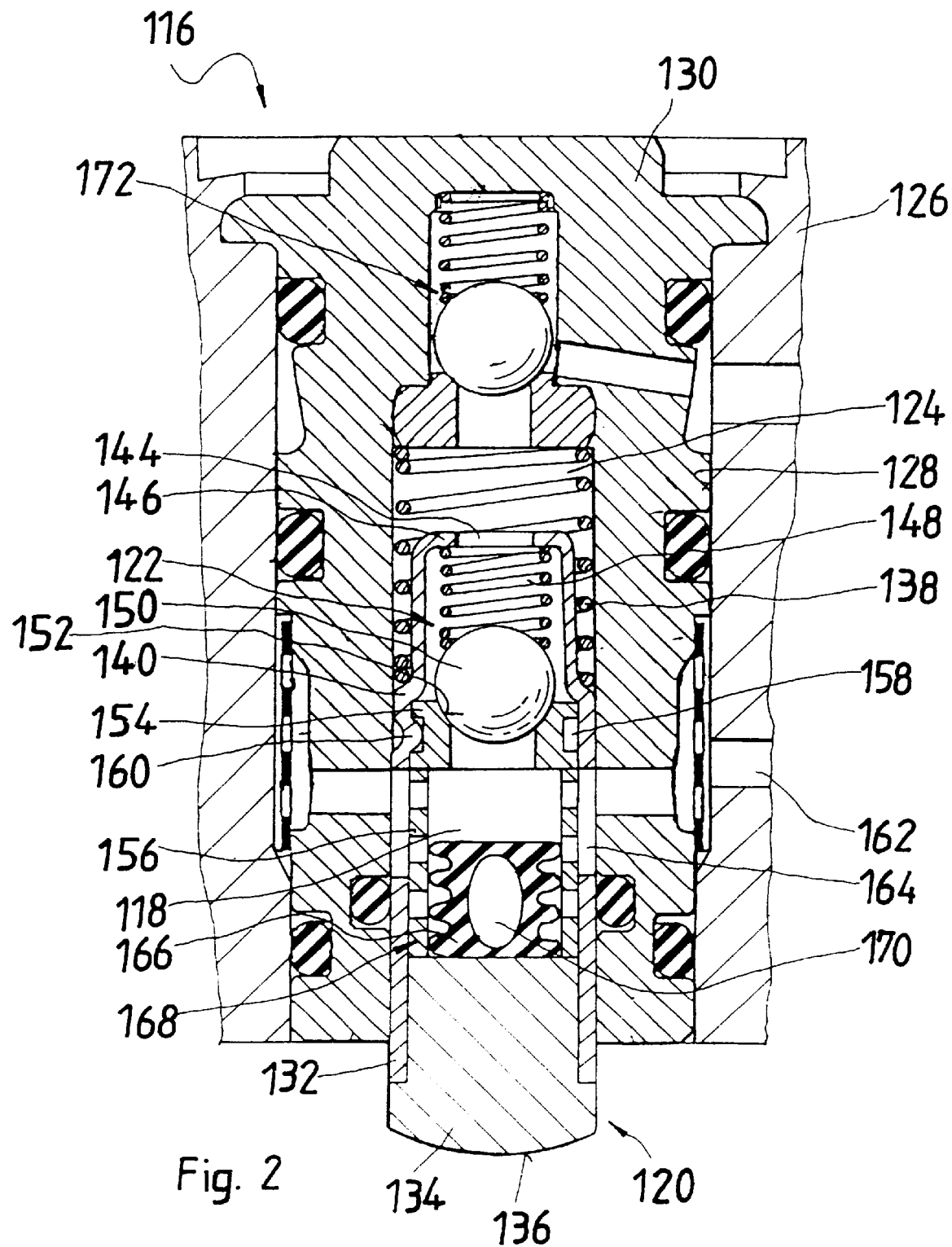
FIG. 2 shows a second exemplary embodiment of a piston pump of the invention in axial section.

In the piston pump 116 shown in FIG. 2, a fluid storage element 118 corresponding to the fluid storage element 86 of the piston pump 10 shown in FIG. 1 is integrated into a hollow chamber in the piston 120. The fluid storage element 118 is immediately adjacent an inlet valve 122, also integrated into the piston 120, that divides the fluid storage element 118 from a displacement chamber 124 of the piston pump 116.

The piston pump 116 is accommodated in a hydraulic block 126, of which only a fragment surrounding the piston pump 116 is shown in the drawing. Other hydraulic components, not shown, such as magnet valves of the slip-controlled vehicle brake system are inserted into the hydraulic block 126 and are hydraulically connected to one another and to the piston pump 116 by the hydraulic block 126. The hydraulic block 126 forms a pump housing of the piston pump 116 of the invention and will hereinafter be called the pump housing 126.

A pump bore 128, into which a bush 130 made as a turned part is inserted, is provided in the pump housing 126.

The piston 120 is axially displaceably received in the bush 130. The piston 120 has a sleeve 132 of metal, which forms a circumferential piston wall. A sealing stopper 134 is pressed-fitted into an open end of the sleeve 132, remote from the displacement chamber 124 of the piston pump 116, and optionally joined to the sleeve 132 by welding. The piston 120 with its stopper 134 protrudes from the pump housing 126. The stopper 134 has a crowned end face 136, with which it rests on the circumference of an eccentric, not shown, in order to drive the piston 120 to execute a reciprocating stroke motion. The stopper 134 is hardened, at least in the region of its crowned end face 136. The piston 120 is kept in contact with the eccentric, not shown, by a helical compression spring that forms a piston restoring spring 138 and engages an annular step 140 of the sleeve 132 of the piston 120.

A spring-loaded check valve acting as an inlet valve 122 of the piston pump 116 of the invention is integrated into the piston 120: An end of the sleeve 132 oriented toward the displacement chamber 124 is deformed radially inward, leaving a flow opening 144, to form a piston end wall 146. Supported on an inner side of this piston end wall 146 is a valve closing spring 148 of the inlet valve 122, embodied as a helical compression spring, which presses a valve ball 150, as a valve closing body, against a conical valve seat 152 of an annular valve seat part 154. This valve seat part 154 inserted into the sleeve 132 is fixed in the sleeve 132 in the axial direction by the annular step 140 of the sleeve 132 and by a tubular filter screen 156, which is inserted into the sleeve 132 between the valve seat part 154 and the sealing stopper 134.

The axial fixation of the valve seat part 154 in the sleeve 132 can be accomplished, instead of or in addition to the filter screen 156, by adhesive bonding, soldering or welding, or form or friction locking to the sleeve 132, for instance. In the 10 exemplary embodiment shown, an encompassing groove 158 is made in the valve seat part 154, and the sleeve 132 is formed into this groove by deformation at some points 160 of its circumference.

An inflow to the piston pump 16 of the invention is effected by means of an inlet bore 162 that discharges radially into the pump bore 128. Continuous transverse bores 164 are made in the sleeve 132 of the piston 120, at the level of the inlet bore 162, and are located on a side of the inlet valve 122 remote from the displacement chamber 124. Between the inlet valve 122 and the stopper 134, the piston 120 of the piston pump 116 of the invention has an interior of large volume, because of the thin-walled sleeve 132, and this interior forms the fluid storage element 118. Upon an intake stroke of the piston pump 116, brake fluid flows through the fluid storage element 118, flowing in through the inlet bore 162 and the transverse bore 164 and out through the inlet valve 122; the fluid storage element 118 communicates with the brake fluid of the vehicle brake system.

The fluid storage element 118 also serves to damp pressure fluctuations and pressure surges. To improve the damping action of the fluid storage element 118, an elastic cylindrical damper body 166 is inserted into the fluid storage element 118. The damper body 166 comprises an elastomer material, such as rubber. To improve its damping performance, a circumferential face of the damper body 166 is given an undulating profile 168, and the damper body 166 is embodied with a hollow chamber 170. Because of the thin-walled sleeve 132, the free space inside the piston 120 is created which can be used for built-in parts, such as the damper body 166.

As an outlet valve 172, a spring-loaded check valve is inserted into the bush 130, on a side of the displacement chamber 124 opposite the piston 120.

The foregoing relates to preferred exemplary embodiments of the invention, it being understood that other variants and embodiments thereof are possible within the spirit and scope of the invention, the latter being defined by the appended claims.

We claim:

1. A piston pump with a pump housing, comprising a pump bore in which the piston pump is received, in said pump housing a piston (22) is axially displaceably guided, the piston being drivable to execute a reciprocating stroke motion, in which the piston pump (10; 116) has an integrated fluid storage element (86, 94; 118, 166).

2. A piston pump in accordance with claim 1, in which the fluid storage element (86; 118) has a variable storage volume.

3. A piston pump in accordance with claim 1, in which the fluid storage element (86; 118) communicates with an inlet valve (36; 122) of the piston pump (10; 116).

4. A piston pump in accordance with claim 1, in which the fluid storage element (118, 166) is integrated into a hollow chamber in the piston (120).

5. A piston pump in accordance with claim 1, in which the fluid storage element (86, 94) is integrated into the pump bore (12).

6. A piston pump in accordance with claim 1, in which the fluid storage element (86) has a diaphragm (94), which is acted upon on one side by fluid to be pumped and on another side with ambient pressure.

7. A piston pump in accordance with claim 1, in which the fluid storage element (86; 118) has a damper element (88; 166).

8. A piston pump in accordance with claim 7, in which the damper element (88) also serves as a seal between the piston (22) and the pump housing (14).

* * * * *